Dec. 30, 1952                M. A. OCKERMAN                2,623,438
                    METHOD OF CUTTING INDENTATIONS IN
                      THE SURFACE OF CIRCULAR DIES
                           Filed May 1, 1947
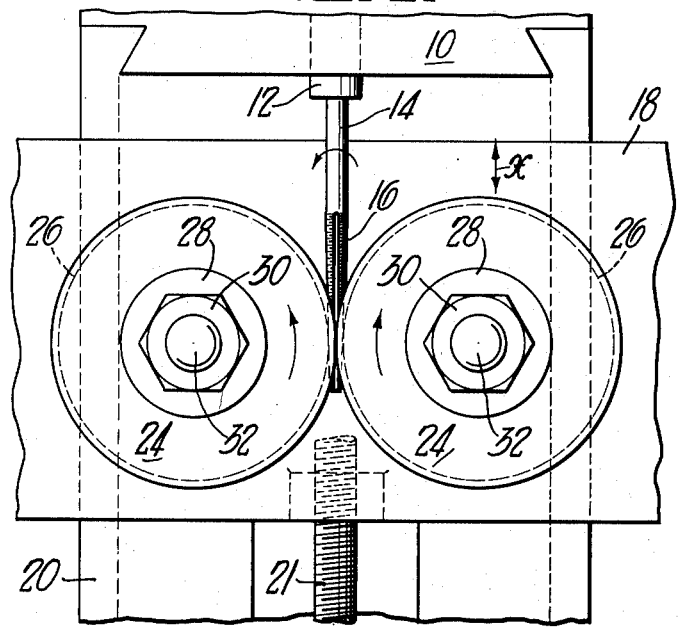
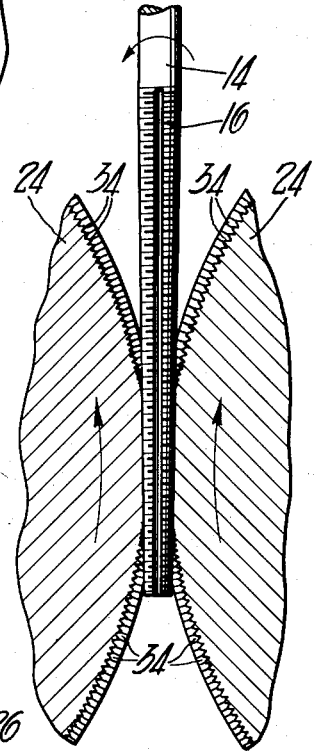
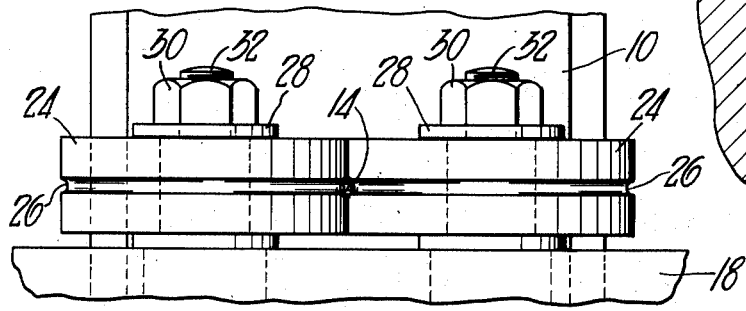
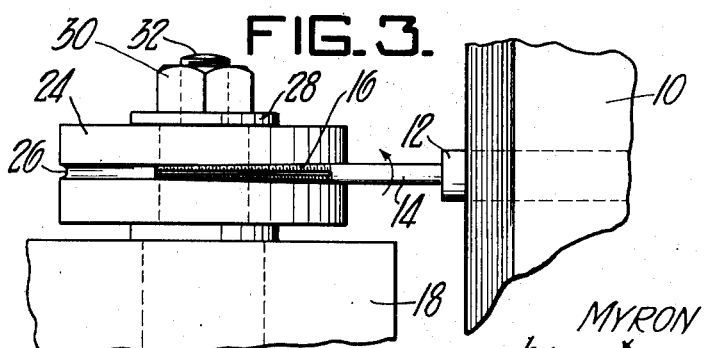
*Inventor:*
MYRON A. OCKERMAN,
by: Donald G. Dalton
his Attorney.

UNITED STATES PATENT OFFICE 2,623,438

METHOD OF CUTTING INDENTATIONS IN THE SURFACE OF CIRCULAR DIES

Myron A. Ockerman, Cleveland, Ohio, assignor to United States Steel Company, a corporation of New Jersey Application May 1, 1947, Serial No. 745,298

1 Claim. (Cl. 90—11)

The present invention relates to an improved method of cutting indentations or threads in the peripheries of circular dies which are used, for example, in the manufacture of nails by feeding wire between such dies prior to heading and pointing operations so as to provide holding fins or protrusions on the nail shanks.

The invention will be fully apparent from the following detailed disclosure and the appended claim when read in connection wtih the accompanying drawings in which:

Figure 1 is a fragmentary plan view of apparatus for the practice of the improved method;

Figure 2 is an end view of Figure 1;

Figure 3 is a side elevation viewed from the right of Figure 1 with one of the circular dies removed; and Figure 4 is an enlarged horizontal section showing fragments of two opposed circular dies in process of having threads or indentations cut in the peripheries thereof in accordance with the present invention.

Referring in detail to the drawings 10 represents a slide of a conventional form of milling machine in which is mounted the horizontal spindle carrying a conventional chuck 12 in which is mounted a tapered plug-tap 14 having conventional thread-cutting teeth 16. In front of the slide 10 there is a conventional milling machine table 18 which is adapted to be moved toward and from the slide 10 as indicated by the double arrow X in Figure 1. The table 18 is slidably mounted on a suitable dove-tailed guide 20, a conventional feed screw 21 engaging a nut secured to the table being adapted to propel the table toward and from the guide 10 in a manner well-known to those familiar with universal milling machines and similar power driven metal working tools.

Mounted on the table 18 I provide a pair of upright circular dies 24—24 in which the threads or indentations are to be formed. The dies illustrated are provided with peripheral grooves 26—26 which are desired to be nicked or to have thread-like indentations formed therein. The dies are held down by washers 28 in conjunction with nuts 30 screwed on the upper threaded extremities of the studs 32 fixedly mounted on the table 18.

In the forming of the threads and indentations by my improved method it is merely necessary to provide the two grooved blanks such as shown at 24 and to rotatably support them on the studs 32. Power is applied to the chuck 12 of the milling machine so as to rotate the tap 14. At the start of the operation the table 18 will have been fed to a position sufficiently remote from the upright slide 10 so that the free end of the tap 14 will be clear of the work. Thereafter, with the tap rotating, the table 18 will be fed toward the slide 10 whereupon the rotary motion of the tap 14 will cause the threads of the tap to cut into the surface at the base of the grooves 26 in the dies. As a result, the screw-like cutting teeth of the tap will rotate the dies or blanks 24 in opposite directions about the axes of the studs 32, as indicated by the arrows in Figure 1, and will, therefore, cause a series of screw thread indentations, such as shown at 34 in Figure 4, to be cut into the grooved peripheral surfaces of the dies.

Prior to my invention it had not been possible to impart to a rolling die the proper size and shape of indentations due to the fact that the shapes of indentations necessary to provide the requisite holding power of nails are necessarily fine and well-defined. Tests made on 8d common nails by dies formed in accordance with the herein disclosed method show that dies so made are well-suited for forming holding fins on nail shanks so as to impart a high holding power thereto.

The dies 24 are preferably made of alloy tool steel, hardened and drawn to the usual requirements for forming dies. These dies are turned to the circular shape illustrated in Figure 2 and a respective semi-circular groove 26 is cut in the peripheral surface of each die blank. It is regarded important that the groove 26 be turned to such a diameter that the circumference of the grooved face of each die 24 should be an exact multiple of the pitch of the thread-like teeth of the tap. This is important since it permits the dies 24 to be rotated more than one complete turn, and yet causes the teeth of the tap to come into accurate register with previously cut indentations and thus avoids mutilating the serrated faces of the dies.

The groove in the center plane of the face of each die blank should be of a radius equal to one-half the diameter of the tap drill for the particular size of tap 14 used. Or in other words the radius of the groove 26 should be approximately equal to the radius at the root of the threading teeth of the tap.

With the two dies 24 set upon the table of the milling machine, as shown and described, the grooves are lined up perfectly in the same horizontal plane. The bed of the milling machine is then raised until the horizontal median plane of the grooves in the faces of the two dies 24 coincide with the longitudinal axis of rotation of the tap 14.

The table 18 on which the dies are mounted is first adjusted to such position that the grooves 26 of the dies are adjacent to, but not touching, the free end of the tap. The clutch controlling the rotation of the chuck 12 carrying the tap 14 is then engaged thus causing the tap to turn. The table 18 is then moved toward the tap to an extent sufficient to cause the free end of the tap to contact the dies. Upon engagement of the tap with the grooves 26 in the dies, the tap starts to cut threads in the faces of the grooves. Since the cutting thread on the tap is helical, a helical thread or indentation is cut in the grooved face of each of the dies. The tap rotates the dies in much the same manner that a worm rotates a worm gear. Thus, the dies 24 are revolved about the studs 32 as indicated by the arrows in Figures 1 and 4. This action continues until threadlike cuts or indentations of the same depth are formed throughout the entire circumference of the grooved face of each die, the threads being cut simultaneously in both dies. It will be understood that when the dies 24 have been turned one complete revolution, chips of metal to a depth determined by the particular position of the tap will have been cut out and, therefore, it is not necessary to continue the operation. But it might be difficult in practice to stop the rotation of the tap at the exact instant that each of the dies have made exactly one revolution. Since the circumferences of the grooves in the faces of the respective dies are an exact multiple of the pitch of the cutting threads of the tap, no harm will be done if the dies are rotated more than a complete revolution. Continued turning of the dies beyond a single revolution will insure that all the cut-out metal or chips are cleared from the dies.

Under certain conditions after the dies 24 have each revolved one complete revolution for a given setting of the tap as above described, the operator may advance the table 18 a short distance. This will cause the end of the tapered tap 16 to make a deeper cut in the grooved face of the dies. The operation is continued for a given position of the table 18 until the dies 24 have again revolved one complete revolution. By this operation the faces or concave grooves of the dies 24 will have been cut to form threads or indentations of the same depth and of the same pitch. The tapered tap 16 may be advanced repeatedly in small increments in order to cut threads in the dies to any desired depth. The number of cuts or complete revolutions of the dies will depend somewhat upon the characteristics of the particular steel used for the dies. When a relatively soft steel is used, a fewer number of cuts will be required than is the case where a relatively harder steel is used.

The description and drawings forming part of this specification are to be interpreted in an illustrative rather than a limiting sense since various modifications may be made by those skilled in the art without departure from the invention as defined by the appended claim.

I claim:

The method of cutting tooth-forming indentations on the grooved peripheral surfaces of a pair of opposed circular dies with a rotating tapered tap having thread-cutting teeth of a predetermined pitch, comprising the steps of rotatably mounting two grooved circular die blanks in spaced relation in a common plane with the grooves thereof opposing each other defining contnuous opening of uniform depth adapted to receive the tap, advancing the blanks a predetermined distance axially of said rotating tap with said tap positioned between said blanks and in cutting contact with the opposed grooves thereof, stopping the advancing movement of said blanks at a point along the length of the tapered tap that would give the depth of indentations desired, meanwhile continuing the rotation of the tap to effect rotation of said circular blanks 360 degrees in opposite directions by worm and worm-wheel action of the tap and blanks while the tap cuts simultaneously into the opposed grooved peripheries of the blanks.

MYRON A. OCKERMAN.

REFERENCES CITED

The following references are of record in the file of this patent:

UNITED STATES PATENTS

| Number | Name | Date |
|---|---|---|
| 928,489 | Allen et al. | July 20, 1909 |
| 1,344,299 | Hansen | June 22, 1920 |
| 1,705,893 | Barnhart | Mar. 19, 1929 |
| 1,728,198 | Brussel | Sept. 17, 1929 |
| 2,428,301 | Surerus | Sept. 30, 1947 |

FOREIGN PATENTS

| Number | Country | Date |
|---|---|---|
| 18,167 | Great Britain | Oct. 26, 1889 |
| 50,063 | Germany | Dec. 18, 1889 |